Oct. 9, 1956     R. L. CROWELL ET AL     2,765,543
READING DEVICE
Filed July 22, 1955     2 Sheets-Sheet 1

INVENTORS
Robert L. Crowell, William J. Kendall
& Steven Hahn
By Frederick Breitenfeld
ATTORNEY Oct. 9, 1956 R. L. CROWELL ET AL 2,765,543
READING DEVICE
Filed July 22, 1955 2 Sheets-Sheet 2
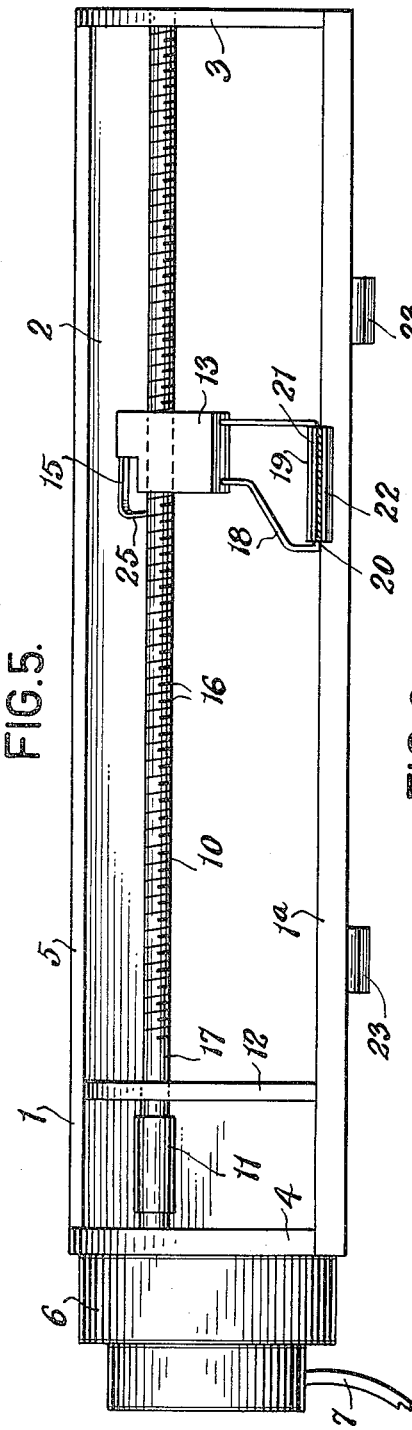
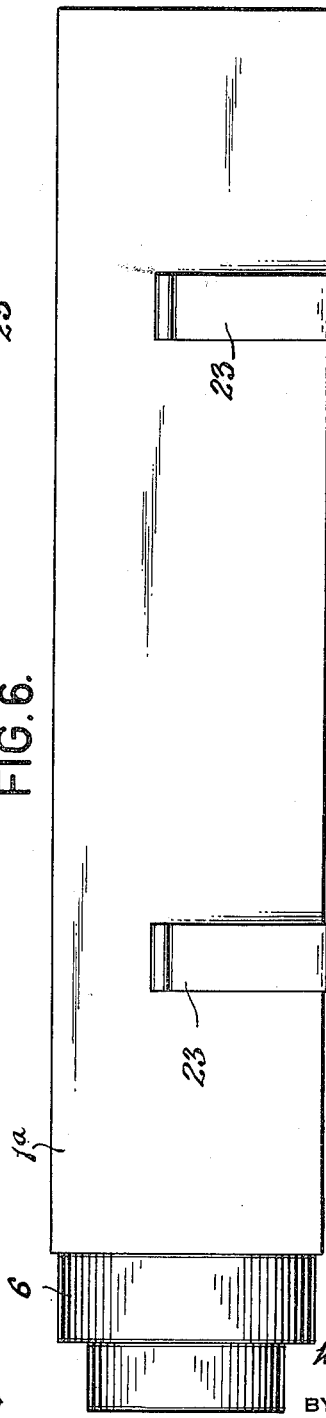
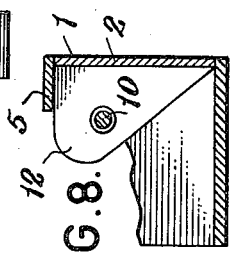
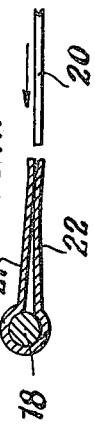
INVENTORS
Robert L. Crowell
William J. Kendall
Steven Hahn
BY
Frederick Breitenfeld
ATTORNEY

United States Patent Office 2,765,543
Patented Oct. 9, 1956

2,765,543

READING DEVICE

Robert L. Crowell, Stamford, and William J. Kendall, Greenwich, Conn., and Steven Hahn, New York, N. Y.; said Kendall and Hahn assignors to said Crowell Application July 22, 1955, Serial No. 523,796

2 Claims. (Cl. 35—35)

This invention relates generally to devices for use in testing or teaching reading skill, and for aiding in the development of reading ability, and has particular reference to the type of reading device in which an indicator moves downwardly across a page of reading matter to expose the printing line by line.

It is a general object of the invention to provide a reading device of simplified construction and mode of use, composed of mechanically simple and inexpensive parts and hence manufacturable at low cost; to provide a device that is light in weight yet staunch and practical and capable of use over long periods without undue wear or impairment of smooth operation; and to provide these advantages in a construction that is devoid of the bulkiness, costliness and relative complexities of comparable reading devices heretofore proposed.

It is another object of the invention to provide a low-cost device of this character which will more readily and easily enable the reader or an instructor to determine the speed at which a reader can effectively read, and thus be able to develop and enhance this skill.

The moving parts of the improved device are actuated by an electric motor of small size and low power consumption, and it is a feature of the invention to provide for variability of reading speeds without necessarily employing a variable-speed motor. By using a constant-speed motor desirable savings in weight, cost and complexity can be effected. In accordance with our invention the motor moves a guide indicator at a constant linear speed downwardly across the page of reading matter, and the variabilities of reading skill are provided for by employing successive pages having varying type sizes and line densities.

Another and more specific object is to provide a reading device sufficiently light and compact to be capable of use by direct attachment to a book of conventional size, or equivalent bundle of reading sheets.

The invention further contemplates the provision of means for harmlessly halting the linear movement of the indicating device when the bottom of a page or sheet is reached; it contemplates means for enabling the indicating device to be manually moved upwardly toward the top of each page without interruption of motor operation, while the propulsion or travel of the indicating device toward the bottom of the page is caused by a positive drive between the indicating device and a rotatable threaded shaft.

With these and other objects to be hereinafter set forth in view, we have devised the arrangement of parts to be described and more particularly pointed out in the claims appended hereto.

Reference is to be had to the accompanying drawings, in which an illustrative embodiment of the invention is shown, wherein Fig. 1 is a top plan view of a reading device, constructed in accordance with the invention;

Fig. 5 is a side elevational view of the reading device on an enlarged scale;

Fig. 6 is a view looking at the underside of the reading device;

Fig. 7 is a detail sectional view, taken substantially on the line 7—7 of Fig. 1, and Fig. 8 is a sectional view taken substantially on the line 8—8 of Fig. 1.

Figure 1:
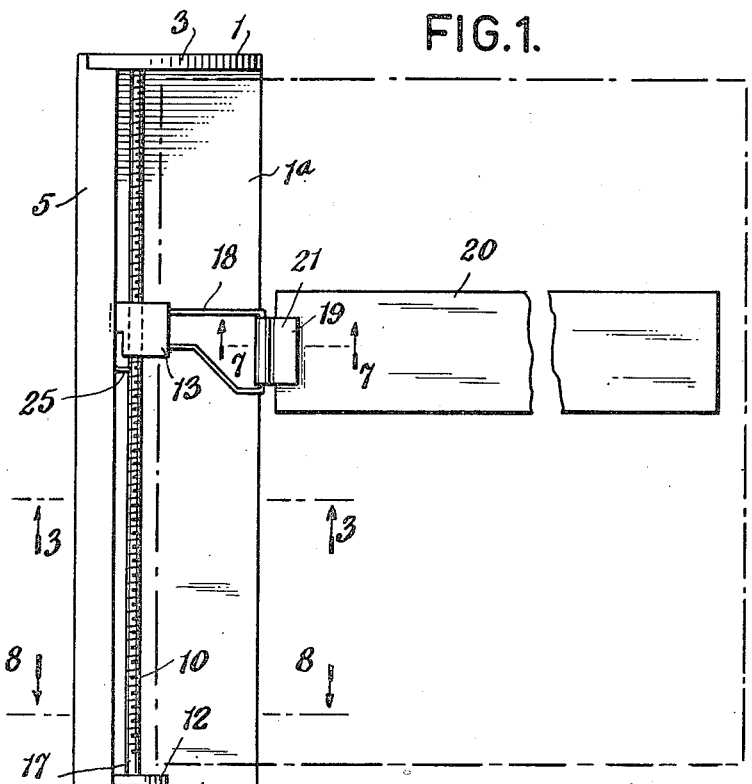

The device consists essentially of a threaded shaft mounted for rotation in a casing adapted to be supported alongside the left-hand margin of a page of reading matter, the shaft extending parallel to said left-hand margin and controlling the movement down the page of an indicator or guide.

Referring to the drawings, 1 indicates the casing of the device, and 1a indicates the base portion of the casing. The side wall 2 of the casing 1 extends upwardly from the base or bottom 1a, and the end walls 3 and 4 extend between and are solidly secured to the wall 2 and bottom 1a. A reinforcing strip 5 may extend along the casing thus produced. The body or casing 1 of the device may be made of any suitable material, such as any one of the numerous plastics, wood, or lightweight metal.

Secured to the outer side of the end wall 4 of the casing is an electric motor 6, provided with a conventional electrical cord 7 by which it may be connected to the usual electric outlet socket.

The motor may be of any appropriate kind, but we prefer for the purpose a synchronous hysteresis motor adapted to operate on 60-cycle 110-volt alternating current at a constant speed of 300 R. P. M.

The shaft of the motor 6 is shown at 8 and the shaft may, if desired, be driven from gear-reduction means contained in the motor housing. Shaft 8 extends through the end wall 4 and is connected to a lengthy, threaded rotatable worm shaft 10 by means of a flexible coupling 11. This coupling may consist of a sleeve of rubber, a coil spring, or other flexible means to connect together the two shafts 8 and 10 and cause rotative movement of the threaded shaft 10. The flexible connection 11 between the two shafts 8 and 10 compensates for any slight axial disalignment of them, and in addition tends to absorb any vibration caused by operation of the motor.

The threaded shaft 11 is rotatively mounted in the end wall 3 and also in a rigid partition member 12 located near one end of the casing.

Figure 4:
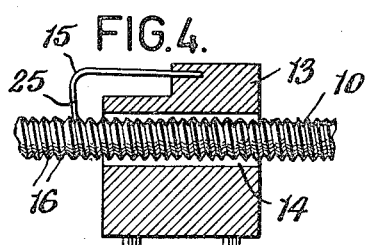
Fig. 4 is an enlarged sectional view through the guide block.

Mounted for axial movement along the shaft 10 is a guide block 13. This block is provided with a bore 14 (Fig. 4) of a diameter to permit the block to be freely slid along the shaft 10. At 15 is a spring finger which has one end anchored in the block, and its other end 25 turned inwardly toward the shaft 10 to engage in the groove defined by the threads 16 of the shaft. This arrangement is such that by rotative movement of the shaft 10, the block will be moved along the length of the shaft in a downward direction with respect to the page of reading.

It is to be noted that at one end of the shaft 10, adjacent to the partition 12, as indicated at 17, the thread 16 is omitted so that when the finger 15 rides up on this unthreaded portion 17 it will be free of engagement with the thread 16 and will thus be halted in its linear advancement.

Carried by the block 13 is a loop 18, composed of wire or other suitable material, and pivotally mounted on the cross bar of the loop 18 is a clip 19 which receives and holds one end of an indicator strip 20. The strip 20 may be composed of thin, flexible plastic, cardboard or metal, and is insertable between the springy jaws 21 and 22 (Fig. 7) of the clip 19 and can thus be removed and replaced whenever desired. This indicator strip 20 is used to expose successive lines of reading matter as the strip is moved over the face of the page to be read; it has a length suitable to extend across the page in connection with which the reading is to take place.

At 23 is shown a pair of spring clips which are secured to the casing 1 by having one end anchored in the base 1a thereof.

Figure 3:
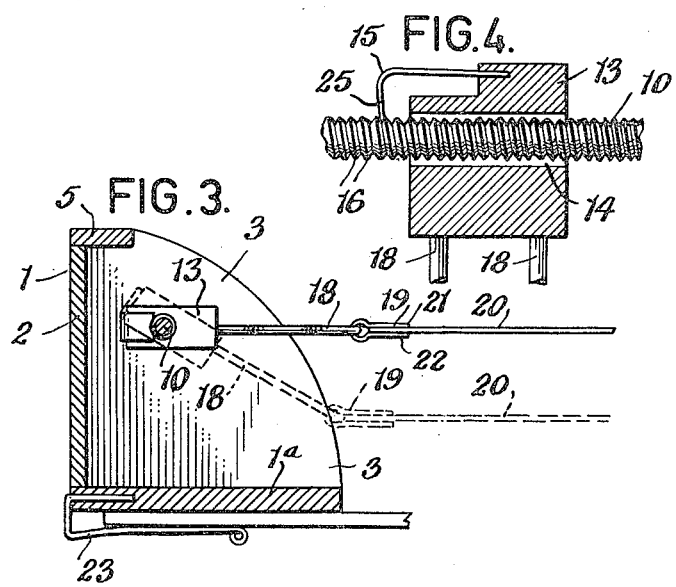
Fig. 3 is a sectional view on an enlarged scale, taken substantially on the line 3—3 of Fig. 1.
Figure 2:
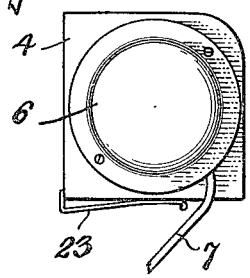
Fig. 2 is an end elevational view, looking at the end provided with the driving motor.

These clips extend transversely, as indicated in Fig. 3, and are adapted to engage with the opened cover of a book, to establish a removable clamped engagement between the book and the reading device.

From the foregoing, the manner in which the reading device is used will be readily understood. A book to be read, or other stack or collection of sheets or pages, has its book cover or backing for the sheets inserted between the bottom of the base member 1a and the clips 23, with the sheets or pages resting within the casing and the uppermost page or sheet located immediately beneath the indicator strip 20. The strip 20 is brought to a starting position under the topmost line of reading matter by manually sliding the block 13 along the length of the threaded shaft 10 in a direction toward the top of Fig. 1. It will be noted that during this manual movement of the block 13, the spring finger 15 will ride freely like a pawl along the surface of the shaft 10, but can be moved downwardly only by rotative movement of the shaft 10 through operation of the electric motor 6. When the motor 6 is set in operation, shaft 10 will be rotated and through the engagement of the threads thereon with the spring finger 15, the block 13 and the indicator strip 20 will be moved down the page at a predetermined speed. It is intended that each line of the reading matter over which the indicator strip is moved be read (if possible) as fast as it is uncovered by the indicator strip. The ability of the reader to keep pace with the moving indicator strip will indicate his reading skill. For comparison purposes, numerous graded pages, having different numbers of words to the line or lines per inch are used.

When the indicating strip reaches the bottom of a page, or moves beyond the bottom of a page to reach the unthreaded portion 17 of the shaft 10, the spring finger 15 will ride up on the unthreaded portion and the movement of the guide block and its attached indicator strip will be halted. This can occur without stalling or overloading the motor, and without causing any damage to any part of the device. The page can then be turned or replaced, and the guide block is readily slid to the top of the new page to begin its downward travel thereover as has just been explained.

Due to the fact that the block 13 is pivotally mounted on the threaded shaft 10, it is freely swingable thereon, and the pivotal connection of the spring clip 19 with the cross bar of the loop 18 cooperates in the production of an articulated indicator which adjusts itself automatically to the height of the number of pages or sheets positioned beneath it.

Obviously, if desired, the shaft can be replaced by another having a thread of greater or less pitch. The speed of linear movement of the guide block can thus be altered.

In general, it will be understood that many of the structural details herein described and illustrated may be modified by those skilled in the art without necessarily departing from the spirit and scope of the invention as expressed in the appended claims.

Having thus described our invention what we claim as new and desire to secure by Letters Patent is:

1. In a device of the character described, a casing, a threaded shaft rotatively mounted in the casing, a motor having a drive shaft, a flexible coupling between the drive shaft and the threaded shaft to thereby cause rotative movement of the threaded shaft when the motor is operated, a block having a bore through which the threaded shaft extends, said bore permitting sliding movement of the block along the length of the shaft, a spring element carried by the block and having a portion in engagement with the threads on the threaded shaft whereby the block will be propelled along the length of the threaded shaft when said treaded shaft is rotated by the motor, a loop member carried by the block, a spring clip carried by the loop member, and an indicator strip detachably held by the spring clip.

2. In a device of the character described, a casing having a bottom, a side wall, end walls and a partition member, an electric motor supported on one of the end walls, said motor having a projecting shaft, a threaded shaft axially aligned with the motor shaft and rotatively supported in one of the end walls and the partition member, a flexible sleeve coupling extending between the motor shaft and the threaded shaft and connecting said shafts, a block pivotally and slidably mounted on the threaded shaft, said block having a spring finger provided with an end located in following engagement with the threaded shaft whereby the block will be moved along the length of the shaft when the threaded shaft is rotated by operation of the motor, said block being provided with a projecting wire loop, a spring clip pivotally mounted on the loop, an indicator strip carried by the spring clip, and means for supporting a page stack below the block and indicating strip so that the strip will rest on the upper page in the stack and be moved linearly down the page when the threaded shaft is rotated.

References Cited in the file of this patent

UNITED STATES PATENTS

| | | |
|---|---|---|
| 469,658 | Chapman | Feb. 23, 1892 |
| 901,879 | Chronik | Oct. 20, 1908 |
| 1,372,360 | McNeill | Mar. 22, 1921 |
| 1,908,874 | Van Alstine | May 16, 1933 |
| 2,252,726 | Peck | Aug. 19, 1941 |
| 2,547,973 | Richards | Apr. 10, 1951 |
| 2,568,577 | Alexander | Sept. 18, 1951 |
| 2,605,558 | Lehner | Aug. 5, 1952 |
| 2,739,569 | Brazee | Mar. 27, 1956 |

FOREIGN PATENTS

| | | |
|---|---|---|
| 99,528 | Switzerland | June 1, 1923 |